Sept. 27, 1955 T. KOSBAHN ET AL 2,719,184
PRODUCTION OF ACETYLENE
Filed May 18, 1950
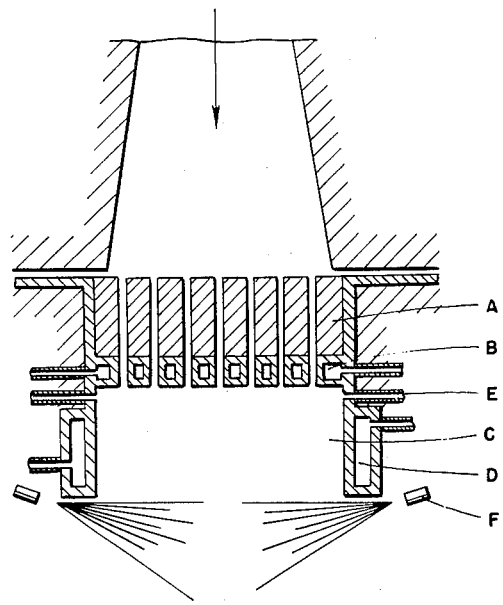
INVENTORS:
THOMAS KOSBAHN
ERWIN LEHRER
BY Spencer Johnston
Cook & Root
ATT'YS

United States Patent Office 2,719,184
Patented Sept. 27, 1955

2,719,184

PRODUCTION OF ACETYLENE

Thomas Kosbahn, Heidelberg-Rohrbach, and Erwin Lehrer, Bad Duerkheim, Germany, assignors to Badische Anilin- & Soda-Fabrik Aktiengesellschaft, Ludwigshafen (Rhine), Rheinland-Pfalz, Germany Application May 18, 1950, Serial No. 162,686

Claims priority, application Germany January 10, 1950

8 Claims. (Cl. 260—679)

The present invention relates to the production of acetylene by the incomplete combustion of hydrocarbons with oxygen. The object of this invention is to provide an improved apparatus for carrying out the said manufacture of acetylene.

According to a known method acetylene may be produced by the incomplete combustion of hydrocarbons with oxygen with the formation of a flame by separately preheating the hydrocarbons and the oxygen, mixing them as quickly and completely as possible together and leading the gas mixture through a distributor of ceramic material provided with a plurality of parallel tubes or channels and in which a gas speed is maintained which is greater than the speed of the flame which forms at the gas outlet from the distributor and burns in the adjoining free reaction chamber. In its preferred form of construction the reaction chamber is given its greater extension perpendicularly to the direction of flow of the gases. This method of working has the drawback that coke-like deposits may be formed between the gas outlets of the distributor which grow and burn hard. The formation of coke cuts the yield of acetylene down and attempts have therefore been made to remove the coke deposits by mechanical means from time to time. Since the coke adheres very firmly, however, the ceramic gas distributor is readily damaged and often becomes unfit for further use.

We have now found, and this is the object of the present invention, that the formation of coke can be substantially prevented and hence any drawback which such coke formation may cause obviated by constructing the gas distributor, not of ceramic material, but of a material of better thermal conductivity, preferably of metal, and providing the same with a cooling device. As a consequence, the gas distributor is kept from overheating and the trifling quantities of coke depositing on such a cooled device do not grow together with the cold surface as they would with a ceramic distributor, but they either fall off by themselves or can be readily removed by slight vibration of the device or simply be stripped off.

The loss of temperature which the gas mixture undergoes on passing through the cooled distributor is but negligible. To obtain a further reduction of this loss, it is advisable to construct the distributor of material of good thermal conductivity only on the side where the gas outlet is situated.

If the flame burns into a reaction chamber the side walls of which are made of ceramic material, deposits of coke may be formed here too, similarly as in the gas distributor; the result is that the formation of the flame is detrimentally affected and the yield of acetylene is reduced. These drawbacks, too, are obviated according to this invention by bounding the reaction chamber with side walls equally provided with cooling means. The life of cooled walls of the said type, preferably those constructed of metal, is practically without limit, whereas the life of ceramic walls is even far shorter than that of ceramic gas distributors.

In the neighborhood of the cooled walls the reaction may be retarded to such an extent that the gas mixture on leaving the reaction chamber is not yet completely reacted. This difficulty can be overcome by introducing small amounts of oxygen or of gases containing oxygen into the reaction chamber in the neighborhood of the cooled walls at the place where the reaction starts. Excellent yields of acetylene are then obtained.

The invention will be further described with reference to the accompanying drawing which shows diagrammatically an embodiment of an apparatus according to the invention by way of example.

The gas mixture to be reacted enters at a temperature of about 600° C. into a gas distributor consisting of a block A perforated by a plurality of channels. The upper part thereof is of ceramic material, but its lower part is made of metal. The lower part comprises hollow spaces B through which cooling water circulates. Contiguous with the distributor is the reaction chamber C the walls of which are also made of metal. They are surrounded by a jacket D through which cooling water circulates. Close to the gas outlet side of the distributor, tubes E are provided for the introduction of small amounts of oxygen. The reaction chamber is limited at the bottom by a zone into which water is injected by means of jets F for quenching the hot reacted gases. If a mixture of about 800 cubic meters of methane and 500 cubic meters of oxygen is reacted in this apparatus per hour, the output will be about 0.170 cubic meter of acetylene for each cubic meter of methane used, and no disturbances whatever will be experienced, even after operation for months.

What we claim is:

1. In an apparatus for the production of acetylene by the incomplete combustion of hydrocarbons with oxygen in a flame reaction, the combination of a mixing chamber for said hydrocarbons and oxygen, a reaction chamber bounded by side walls of metal having fluid conducting conduits associated therewith adapted to receive a circulating cooling fluid and a cooling fluid circulating therein, a gas distributor interconnecting said chambers, said distributor comprising a block of material having a plurality of parallel channels extending therethrough from said mixing chamber to said reaction chamber, the end of said block adjacent said reaction chamber being formed of metal and the remainder of the block being formed of ceramic material, said metal end of said block having fluid conducting conduits therein adapted to receive a circulating cooling fluid, a cooling fluid circulating in the latter conduits, and means for supplying oxygen adjacent said metal end of said block and adjacent said side walls.

2. In an apparatus for the production of acetylene by the incomplete combustion of hydrocarbons with oxygen in a flame reaction, the combination of a mixing chamber for said gases, a reaction chamber bounded by side walls of heat conducting material having fluid conducting conduits associated therewith adapted to receive a circulating cooling fluid, and a gas distributor interconnecting said chambers, said distributor comprising a block of metal having a plurality of perforations extending therethrough and fluid conducting conduits in said block adapted to receive a circulating cooling fluid.

3. In an apparatus for the production of acetylene by the incomplete combustion of hydrocarbons with oxygen in a flame reaction, the combination of a mixing chamber for said gases, a reaction chamber bounded by side walls of heat conducting material having fluid conducting conduits associated therewith adapted to receive a circulating cooling fluid, and a gas distributor interconnecting said chambers, said distributor comprising a block of material having a plurality of perforations extending therethrough, the gas outlet portion of said distributor being made of metal and having fluid conducting conduits therein adapted to receive a circulating cooling fluid.

4. In an apparatus for the production of acetylene by the incomplete combustion of hydrocarbons with oxygen in a flame reaction, the combination of a mixing chamber for the hydrocarbons and oxygen, a reaction chamber bounded by side walls of metal having fluid conducting conduits associated therewith adapted to receive a circulating cooling fluid, and a gas distributor interconnecting said chambers, said distributor comprising a block of metal having a plurality of perforations extending therethrough from said mixing chamber to said reaction chamber and fluid connecting conduits therein adapted to receive a circulating cooling fluid.

5. In an apparatus for the production of acetylene by the incomplete combustion of hydrocarbons with oxygen in a flame reaction, the combination of a mixing chamber for hydrocarbons and oxygen, a reaction chamber bounded by side walls of metal having fluid conducting conduits associated therewith adapted to receive a circulating cooling fluid, and a gas distributor interconnecting said chambers, said distributor comprising a block of material having a plurality of perforations extending therethrough from said mixing chamber to said reaction chamber, the gas outlet portion of said distributor being made of metal and having fluid conducting conduits therein adapted to receive a circulating cooling fluid.

6. In an apparatus for the production of acetylene by the incomplete combustion of hydrocarbons with oxygen in a flame reaction, the combination of a mixing chamber for said hydrocarbons and oxygen, a reaction chamber bounded by side walls of metal having fluid conducting conduits associated therewith adapted to receive a circulating cooling fluid, a gas distributor interconnecting said chambers, said distributor comprising a block of metal having a plurality of perforations extending therethrough from said mixing chamber to said reaction chamber and fluid conducting conduits in said block adapted to receive a circulating cooling fluid, and tubes extending through the walls of said reaction chamber at a point adjacent said distributor through which oxygen can be introduced into said reaction chamber.

7. A process for the production of acetylene by the incomplete combustion of hydrocarbons with oxygen in a flame reaction which comprises passing a gaseous mixture of a hydrocarbon and oxygen through a plurality of channels in a block of material, at least the outlet ends of said channels being formed from metal and having cooling spaces therein, passing a cooling fluid through said cooling spaces, and burning said gaseous mixture.

8. A process for the production of acetylene by the incomplete combustion of hydrocarbons with oxygen in a flame reaction which comprises passing a gaseous mixture of a hydrocarbon and oxygen through a plurality of channels in a block of material, at least the outlet ends of said channels being formed from metal and having cooling spaces therein, passing a cooling fluid through said cooling spaces, burning said gaseous mixture in a reaction chamber contiguous with the outlet end of said channels, said chamber being bounded by side walls of metal having cooling conduits associated therewith, passing a cooling fluid through said cooling conduits, and adding oxygen to the reaction zone in the neighborhood of said side walls at the outlet end of said channels in said block of material.

References Cited in the file of this patent

UNITED STATES PATENTS

| | | |
|---|---|---|
| 745,635 | Lummis | Dec. 1, 1903 |
| 1,193,798 | Landis | Aug. 8, 1916 |
| 1,236,793 | Warman | Aug. 14, 1917 |
| 1,804,249 | Day | May 5, 1931 |
| 2,096,267 | Tilghman | Oct. 19, 1937 |
| 2,167,471 | Auerbach | July 25, 1939 |
| 2,173,825 | Curtis et al. | Sept. 26, 1939 |
| 2,377,245 | Krejci | May 29, 1945 |
| 2,432,885 | Hasche | Dec. 16, 1947 |
| 2,442,460 | Hasche | June 1, 1948 |

FOREIGN PATENTS

| | | |
|---|---|---|
| 222,188 | Great Britain | Sept. 22, 1924 |